(12) United States Patent
Kornev et al.

(10) Patent No.: US 11,799,910 B2
(45) Date of Patent: Oct. 24, 2023

(54) NETWORK CONNECTION MANAGEMENT

(71) Applicant: Cujo LLC, Walnut, CA (US)

(72) Inventors: Evgeny Kornev, Helsinki (FI); Matti Niemenmaa, Helsinki (FI)

(73) Assignee: Cujo LLC, Walnut, CA (US)

( * ) Notice: Subject to any disclaimer, the term of this patent is extended or adjusted under 35 U.S.C. 154(b) by 61 days.

(21) Appl. No.: 17/371,698

(22) Filed: Jul. 9, 2021

(65) Prior Publication Data
US 2023/0008762 A1    Jan. 12, 2023

(51) Int. Cl.
*H04L 9/40* (2022.01)
*H04L 67/02* (2022.01)
*H04L 101/663* (2022.01)

(52) U.S. Cl.
CPC ........ *H04L 63/166* (2013.01); *H04L 63/0236* (2013.01); *H04L 63/20* (2013.01); *H04L 67/02* (2013.01); *H04L 2101/663* (2022.05)

(58) Field of Classification Search
None
See application file for complete search history.

(56) References Cited

U.S. PATENT DOCUMENTS

| | | | |
|---|---|---|---|
| 9,888,037 B1 | 2/2018 | Mehr et al. | |
| 10,462,116 B1* | 10/2019 | Sharifi Mehr | ........ H04L 63/062 |
| 2020/0120555 A1* | 4/2020 | Patil | ..................... H04L 63/0428 |
| 2020/0204519 A1* | 6/2020 | Isaev | ..................... H04L 63/029 |
| 2021/0120403 A1* | 4/2021 | Fajri | ..................... H04W 12/04 |
| 2021/0288738 A1* | 9/2021 | Byagowi | ............... H05K 7/1491 |
| 2021/0385292 A1* | 12/2021 | Lowe | ..................... H04L 9/0844 |
| 2021/0409447 A1* | 12/2021 | Dutta | ........................ H04L 69/24 |
| 2022/0060452 A1* | 2/2022 | Kosbab | ................. H04L 63/126 |
| 2022/0094682 A1* | 3/2022 | Gaubas | ............... H04L 63/0236 |
| 2022/0116319 A1* | 4/2022 | Dutta | ................... H04L 12/4633 |
| 2022/0124186 A1* | 4/2022 | Dutta | ....................... H04L 67/14 |
| 2022/0385719 A1* | 12/2022 | Yokomitsu | .............. H04L 67/02 |

OTHER PUBLICATIONS

Extended European Search Report for European Patent Application No. 22182649.8, dated Nov. 30, 2022, 7 pages.
Wang, E., et al., "TLS Proxy Best Practice (draft-wang-tls-proxy-best-practice-00)," Internet Engineering Task Force, OPSEC Working Group, Nov. 4, 2019, 14 pages.

* cited by examiner

*Primary Examiner* — Quang N Nguyen
(74) *Attorney, Agent, or Firm* — Dority & Manning, P.A.

(57) ABSTRACT

A network apparatus receives a first message relating to a transport layer security (TLS) handshake process for an initialization phase of a Quic user datagram protocol (UDP) Internet Connection (QUIC) connection from a client computing device toward a target computing device, wherein the first message of the TLS handshake process comprises at least a connection identifier. The network apparatus generates a second message relating to the TLS handshake process in response to the first message, wherein a cipher suite value of the second message is set to an invalid cipher suite value for the client computing device and wherein the invalid cipher suite value is unsupported by the client computing device, and sends the second message to the client computing device to cause the client computer device to close the QUIC connection.

20 Claims, 3 Drawing Sheets

NETWORK CONNECTION MANAGEMENT

TECHNICAL FIELD

The present application relates generally to network security, and specifically to methods and apparatuses for managing network connections.

BACKGROUND

In various network security solutions, connections between network devices must often be authorized by an external service, such as a security service provider or the like. The external service may be used to determine whether the user is allowed to access requested contents or whether the connections should be blocked, for example.

It can be desirable to manage network connections without risking security at the same time.

SUMMARY

According to an aspect of the invention there is provided a method as specified in claim 1.

According to other aspect of the invention, there is provided an apparatus in a computer network system as specified in claim 9.

According to other aspect of the invention, there is provided a non-transitory computer-readable medium comprising stored program code, the program code comprised of computer-executable instructions that, when executed by a processor device, causes the processor device to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
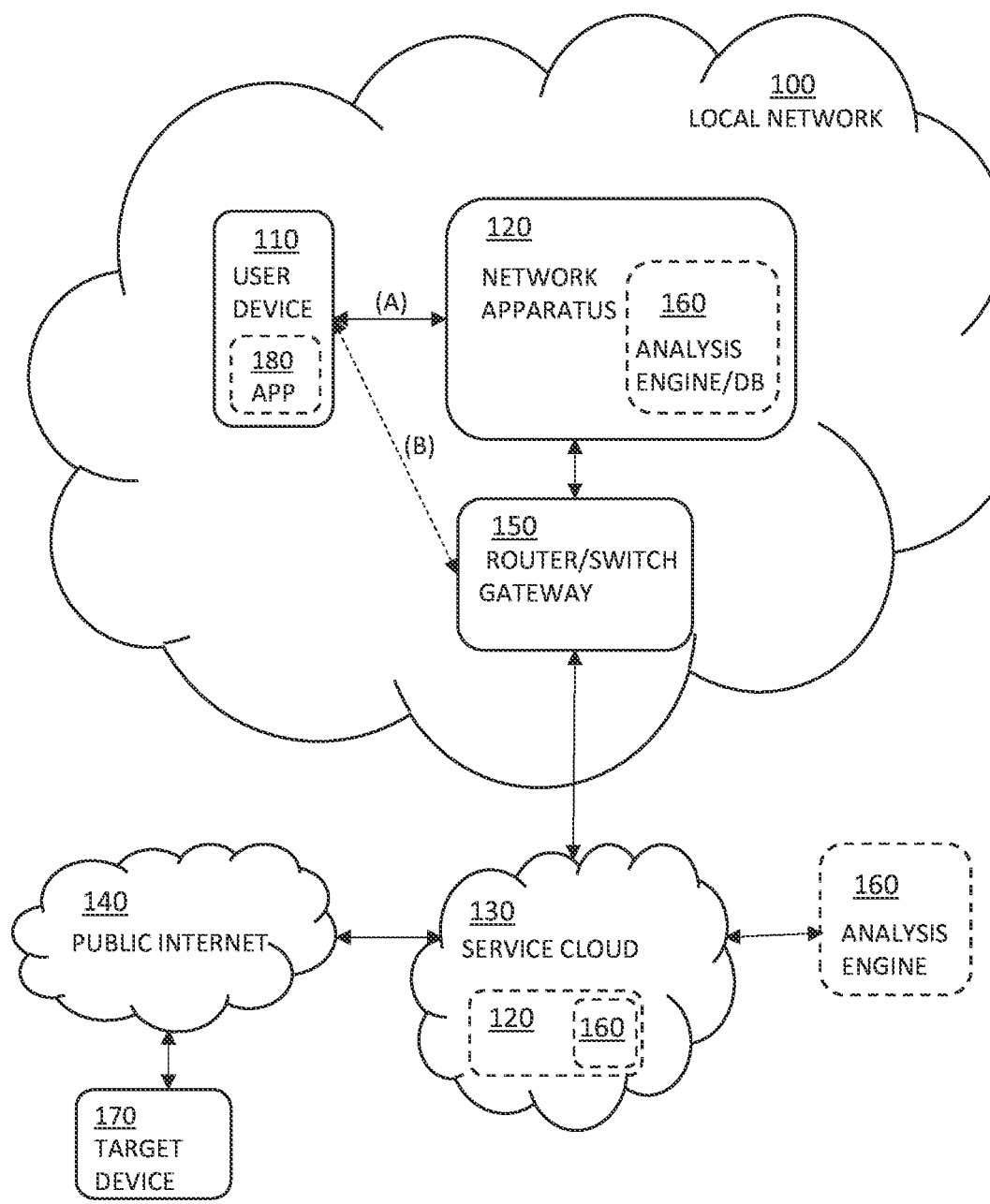
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more computing devices 110 with a client application 180, the network apparatus 120, a local gateway 150, and an analysis engine/database 160. The example system also includes a service cloud 130, such as a network operator's cloud or a security service provider's cloud and the Internet 140. The analysis engine 160, such as a web resource analysis engine, may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the client computing device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The client device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 may collect information e.g. about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user/client device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the gateway 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

QUIC (Quic user datagram protocol (UDP) Internet Connection) is an encrypted transport layer network protocol, and it is the new era of network communication that is considered fast, secure and reliable. The QUIC protocol has qualities of transport layer security (TLS) connections and TLS encryption, and it is implemented on UDP.

The QUIC protocol uses keys derived from a TLS handshake and relies on TLS for authentication and negotiation of parameters related to security and performance. The QUIC protocol contains an initialization phase where handshake messages are sent and received between a client and a server. First message of TLS handshake is when the client initiates a connection to the server using a client hello message. Server hello in turn describes a message used in the TLS handshake process that is sent by the server in response to the client hello message. The client hello and server hello messages are used to establish how the client and server should communicate.

When there is a need to terminate a QUIC connection, for example due to security related reasons, before a hypertext transfer protocol (HTTP) connection has started, a naive way of achieving this would be for the server not to respond. However, this results in the client assuming the network is unreliable and attempting retransmission. Behaviour of retransmission methods varies from client to client but they typically involve an exponential backoff system. Further, if a nonsensical server hello or handshake is returned, most clients typically go into retransmission.

Embodiments of the invention enable managing a QUIC session, such as blocking or terminating the QUIC connection, while at the same time preventing client going into a backoff state. For example, denying/blocking QUIC connections can be beneficial for enabling different safebrowsing features. It enables blocking connectivity while at the same time without risking security.

Figure 2:
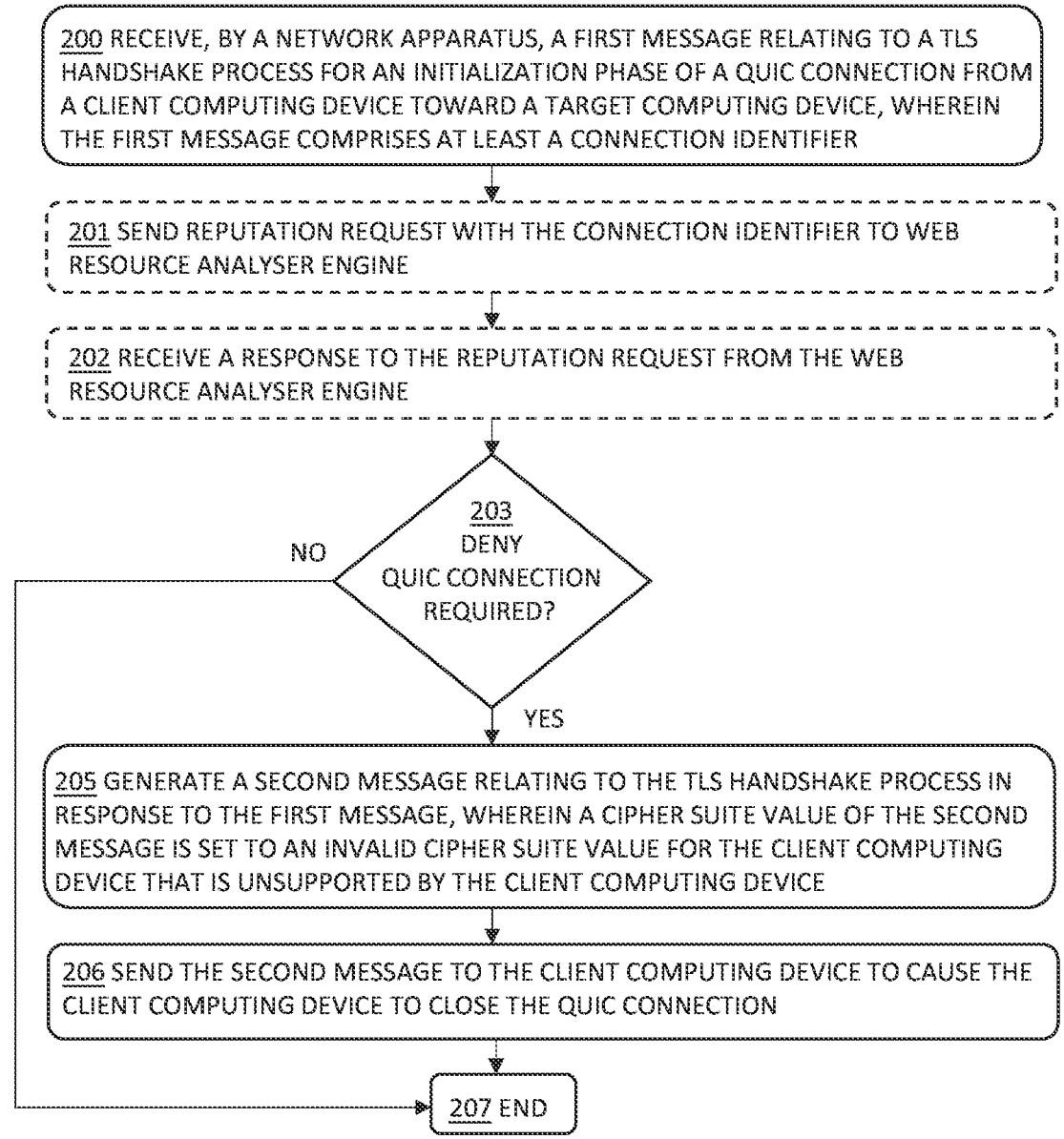
FIG. 2 is a flowchart illustrating a method, according to an embodiment.

FIG. 2 is a flow diagram illustrating an embodiment of a method at a network apparatus connecting one or more computing devices to a computer network. The network apparatus monitors connections relating to monitored network traffic passing through the network apparatus. The network apparatus may receive connection requests from client computing devices toward target computing devices and manage the connections according to predetermined rules or settings, for example.

In 200, a first message relating to a TLS handshake process for an initialization phase of a QUIC connection from a client computing device toward a target computing device is received by the network apparatus. The first message of the TLS handshake process comprises at least a connection identifier. The connection identifier extracted from the first message identifies the target computing device.

In an optional step 201, the network apparatus sends a reputation request with the connection identifier to a web resource analyser engine.

In 202, the network apparatus receives a response to the reputation request from the web resource analyser engine in case the reputation request has been sent.

In 203, the network apparatus determines whether there is a need to deny or block the QUIC connection. This determination may be based on the results of the received response to the reputation request for example. Also, any other reasons, such as security or privacy protection related detections, may also be used to determine whether the QUIC connection should be denied or blocked.

In an embodiment, in response to determining that the QUIC connections needs to be blocked/denied, the network apparatus may identify cipher suite values that are not supported by the client computing device based on the QUIC protocol, for example. Cipher suite defines the cryptographic primitives or algorithms that are utilized in a particular TLS session for helping in securing network connections. In another embodiment, a list of cipher suites that are supported by the client computing device are received with the first message, and an invalid cipher suite value that is not found on the list of cipher suites is selected.

In 205, the network apparatus generates a second message relating to the TLS handshake process in response to the first message, wherein a cipher suite value of the second message is set to an invalid cipher suite value for the client computing device. The invalid cipher suite value for the computing device is thus unsupported by the client computing device.

In 206, the network apparatus sends the second message to the client computing device to cause the client computing device to close the QUIC connection. The method ends in 207.

In an embodiment, the connection identifier may comprise a URL (Uniform Resource Locator) extracted from a header (when an HTTP(S) request to the target computer is made) or SNI (Server Name Indication) extracted from a TLS (Transport Layer Security) handshake.

In an embodiment, the step of generating the second message is started in response to determining that denying the QUIC connection is required before start of a HTTP connection.

In an embodiment, the first message corresponds to a client hello message of the TLS handshake process and the second message corresponds to a server hello message of the TLS handshake process.

In an embodiment, in response to receiving a response to the reputation request from the web resource analyzer engine, the QUIC connection is approved or denied based on the result included in the response from the web resource analyser engine.

In an embodiment, in response to detecting an expiration of a timer before the receipt of the response from the web resource analyser engine has been received, the connection request is approved.

In an embodiment, the method further comprises in response to receipt of the response from the web resource analyser engine before expiration of the timer, approving the connection request or denying the connection request based on the response from the web resource analyser engine.

In an embodiment, the method further comprises maintaining a local cache of reputation request response data received from the web resource analyser engine and in response to detecting a further message relating to a TLS handshake process for an initialization phase of a second QUIC connection from a second client computing device toward the target computing device, wherein respective reputation request response data of the same target computing device being already in the local cache of reputation request response data, approving or denying the further connection request between the client computing device and the target computing device without sending a further reputation request to the web resource analyser engine.

In an embodiment, the cipher suite value is a set of algorithms securing a network connection and wherein the invalid cipher suite value is a cipher suite value that is unsupported by the client computing device. In an embodiment, the invalid cipher suite values are selected based on the QUIC protocol or based on received list of cipher suites supported by the client computing device. The list of cipher suites supported by the client computing device may be received with the first message and a cipher suite value that is not found on the list of cipher suites may be selected as the invalid cipher suite value.

In an embodiment, the first message comprises at least a TLS version and information about the cipher suites that the client computing device is supporting.

In an embodiment, the method further comprises one or more of: reporting a security related incident, controlling or blocking further connections or usage of one or more application of the client computing device, preventing communication between the client computing device and the target computing device, and applying other security measures to protect a local network and/or one or more computing devices of the computer network.

An embodiment of the invention is based on the realization that the most effective approach to block a QUIC connection requires using an appropriate server hello reply. Thus, to terminate a QUIC session without the client going into the backoff state requires the actor wishing to terminate the connection generating a valid TLS server hello message matching the connection ID, version and packet number from the client hello message as per required by the request for comments (RFC) standards related to the QUIC protocol. In the modified server hello message, the cipher suite field is set to an invalid cipher suite value. In an embodiment, this may be implemented, for example, by using the reserved values from the TLS RFC standards (e.g. 0x001c/0x001d). In another embodiment, the cipher suites supported by the client computing device may be identified based on the initialization packet (client hello) sent by the client and then any invalid cipher suite that is not supported by the client is selected to be included in the server hello. This forces the client to believe that the server only supports a cipher suite that the client does not contain which in turn causes the client to close the connection immediately with a connection close (CC) frame. Thus, sending a "correct" reply with an unexpected cipher suite causes the client to believe that the server does not have the cipher that the client has, and a connection close is triggered.

Figure 3:
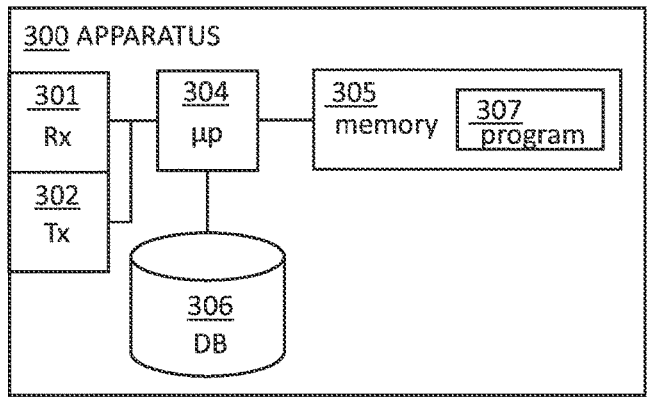
FIG. 3 is a block diagram of an apparatus, according to one embodiment.

Turning now to FIG. 3 that is showing an example of a network apparatus such as a gateway.

A processor is provided that is configured to detect connection requests relating to monitored network traffic passing through the network apparatus. Further, the processor 304 is configured to interrupt transmission of connection requests from a client computing devices to a target computing devices and to extract data identifying the target network computer based on the connection request. The processor is further configured to receive a client hello message relating to a TLS handshake process for an initialization phase of a QUIC connection from a client computing device toward a target computing device. The processor is further configured to transmit a reputation request comprising the extracted data identifying the target computing device to a web resource analyser engine. In some embodiments, the analysis can also be implemented in some other device internal to the apparatus 300. The processor further monitors receiving responses to the connection request from the target computing device and to the reputation request from the web resource analyser engine. The processor 304 is further configured to identify cipher suite values that are unsupported by the client computing device, for example based on the QUIC protocol or based on the list of cipher suites and to generate a server hello message relating to the TLS handshake in response to the client hello message. The processor 302 is configured to set the cipher suite value of the server hello to an invalid cipher suite value for the client computing device based on knowing the cipher suite values that are not supported by the client computing device. The processor 302 is further configured to send the server hello message with the invalid cipher suite value to the client computing device for causing the client computing device to close the QUIC connection.

In an embodiment, the processor 304 is further configured to store data such as data related to the connection requests, state information, reputation data and domain data to the database 306. The database 306 is shown in this example as being located at the apparatus 300, but it will be appreciated that the apparatus 304 may alternatively access a remote database. The database 304 may comprise data collected from user devices or reputation data previously collected from the web resource analyzer engine.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
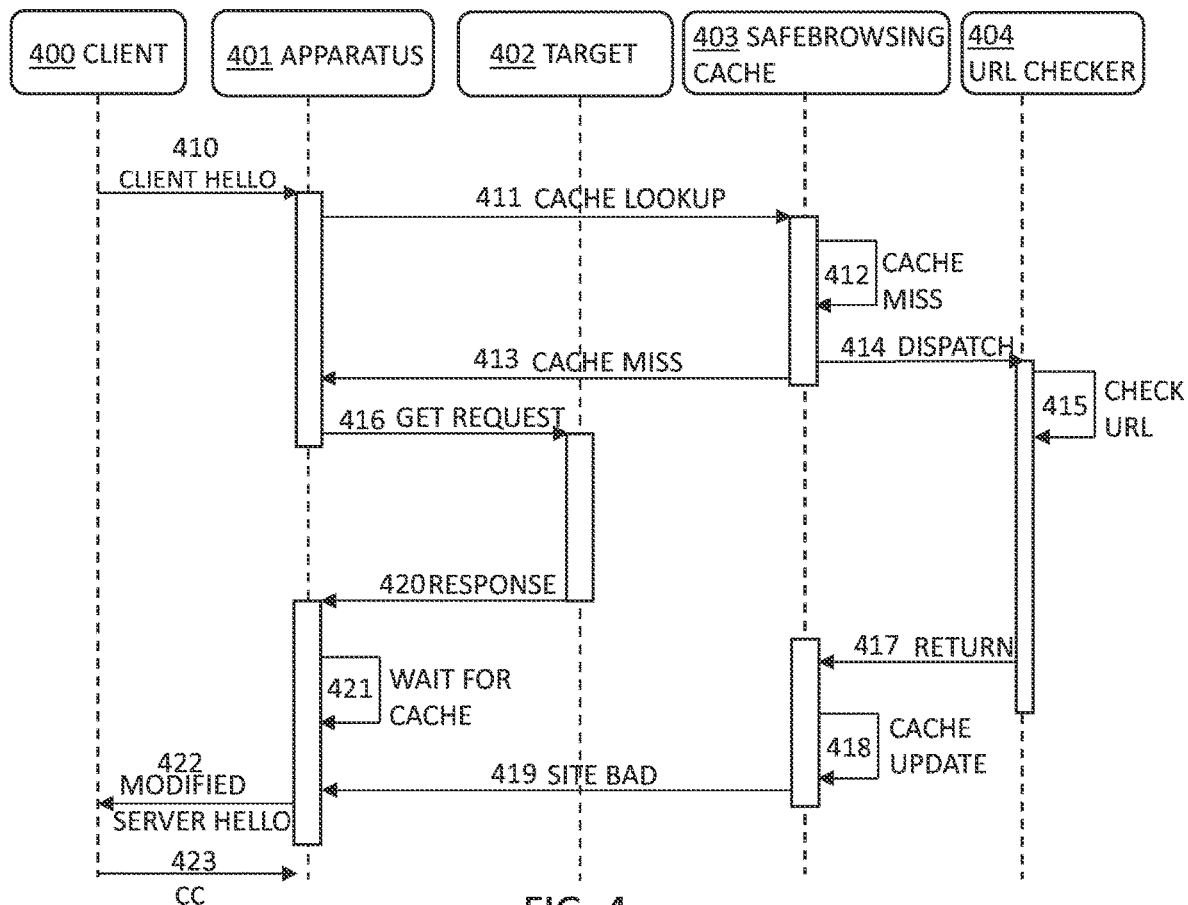
FIG. 4 a signal sequence diagram illustrating a process, according to one embodiment.

FIG. 4 shows an example general flow diagram of a process according to one embodiment.

A network apparatus, such as a home network router (CPE) 401 has received a connection request (410) to a target. At the network gateway 401, when an HTTP(S) request to the target 402 is made, a URL is extracted from the header or in the case of HTTPS, an SNI is extracted from a TLS handshake. In an embodiment, the request may be allowed to continue (416) out to the target malicious site 402 and at the same time a request containing the URL/SNI (414) is sent to the URL analyser 404 for an URL check (415) and a timer is started.

If a response (420) from the target 402 is received after the response 417, 418, 419 from the URL analyser 404, then the response is immediately processed (422), that is, rewritten, dropped or allowed through depending on the URL analyser 404 result. If the response (420) from the target 402 is received before the response from the URL analyser 404, the response is held (421) on the network gateway 401 until the response from the URL analyser is received. Then the response is processed, that is, rewritten, dropped or allowed through depending on the URL analyser 404 result.

In an embodiment, if the response from the target malicious 402 is received and the result from the URL analyser 404 takes longer than a predefined time limit measured with the timer, then the response may be held until the timer has expired and the response is allowed through.

In an embodiment, a local cache 403 can be used on the gateway that stores URL analyser responses. This enables addressing subsequent requests to the same target without any delay. Thus, before a request to the URL analyser 404 is sent, a cache lookup process can be made (411, 412, 413).

In an embodiment, a decision to block a QUIC connection may be made for example based on received results from the URL analyser 404. Thus, a new packet appearing to be like an ordinary server hello but having an invalid cipher suite for the client is generated and sent to the client by the apparatus 401. This is illustrated by the modified server hello 422 in the example of FIG. 4. Receiving the invalid cipher suite by the client 400 causes closing the QUIC connection due to an unsupported cipher suite (423).

It will be appreciated that various modifications may be made to the above-described embodiments without departing from the scope of the present invention. For example, the database or web resource analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises one or more codes for performing the process steps according to the described example embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    receiving, by a network apparatus comprising a processor device, a first message relating to a transport layer security (TLS) handshake process for an initialization phase of a Quic user datagram protocol (UDP) Internet Connection (QUIC) connection from a client computing device toward a target computing device, wherein the first message of the TLS handshake process comprises at least a connection identifier;
    making, by the network apparatus, a determination to block the QUIC connection;
    in response to making the determination to block the QUIC connection, generating a second message relating to the TLS handshake process in response to the first message, wherein a cipher suite value of the second message is set to an invalid cipher suite value for the client computing device and wherein the invalid cipher suite value is unsupported by the client computing device; and
    sending the second message to the client computing device to cause the client computing device to close the QUIC connection.

2. The method according to claim 1, further comprising generating the second message in response to determining that denying the QUIC connection is required before start of a hypertext transfer protocol (HTTP) connection.

3. The method according to claim 1, wherein the first message corresponds to a client hello message of the TLS handshake process and the second message corresponds to a server hello message of the TLS handshake process.

4. The method according to claim 1, further comprising:
    sending, by the network apparatus, a reputation request with the connection identifier to a web resource analyser engine;
    receiving a response to the reputation request from the web resource analyser engine; and
    in response to receipt of the response from the web resource analyser engine, approving the QUIC connection or denying the QUIC connection based on the response from the web resource analyser engine.

5. The method according to claim 4, further comprising:
    maintaining a local cache of reputation request response data received from the web resource analyser engine and in response to detecting a further message relating to a transport layer security (TLS) handshake process for an initialization phase of a second QUIC connection from a second client computing device toward the target computing device, wherein respective reputation request response data of the same target computing device being already in the local cache of reputation request response data; and
    approving or denying the second QUIC connection without sending a further reputation request to the web resource analyser engine.

6. The method according to claim 1, further comprising:
    receiving a list of cipher suites supported by the client computing device with the first message; and
    selecting a cipher suite value that is not found on the list of cipher suites as the invalid cipher suite value.

7. The method according to claim 1, further comprising selecting a cipher suite value as the invalid cipher suite value based on the QUIC standard.

8. The method according to claim 1, wherein the first message comprises at least a TLS version and cipher suites that the client computing device supports.

9. The method according to claim 1, further comprising one or more of:
    reporting a security-related incident;
    controlling or blocking further connections or usage of one or more applications of the client computing device;
    preventing communication between the client computing device and the target computing device; and
    applying other security measures to protect a local network and/or one or more computing devices.

10. An apparatus in a computer network system comprising:
    one or more processor devices, the one or more processor devices configured to:
        receive a first message relating to a transport layer security (TLS) handshake process for an initialization phase of a Quic user datagram protocol (UDP) Internet Connection (QUIC) connection from a client computing device toward a target computing device, wherein the first message of the TLS handshake process comprises at least a connection identifier;
        make a determination to block the QUIC connection;
        in response to making the determination to block the QUIC connection, generate a second message relating to the TLS handshake process in response to the first message, wherein a cipher suite value of the second message is set to an invalid cipher suite value for the client computing device, wherein the invalid cipher suite value is unsupported by the client computing device; and send the second message to the client computing device to cause the client computing device to close the QUIC connection.

11. The apparatus according to claim 10, the one or more processor devices being further configured to generate the second message in response to determining that denying the QUIC connection is required before start of a hypertext transfer protocol (HTTP) connection.

12. The apparatus according to claim 10, wherein the first message corresponds to a client hello message of the TLS handshake process and the second message corresponds to a server hello message of the TLS handshake process.

13. The apparatus according to claim 10, the one or more processor devices being further configured to:
send a reputation request with the connection identifier to a web resource analyser engine;
receive a response to the reputation request from the web resource analyser engine; and
in response to receipt of the response from the web resource analyser engine, approve the QUIC connection or deny the QUIC connection based on the response from the web resource analyser engine.

14. The apparatus according to claim 13, the one or more processor devices being further configured to:
maintain a local cache of reputation request response data received from the web resource analyser engine and in response to detecting a further message relating to a transport layer security (TLS) handshake process for an initialization phase of a second QUIC connection from a second client computing device toward the target computing device, wherein respective reputation request response data of the same target computing device being already in the local cache of reputation request response data; and
approve or deny the second QUIC connection without sending a further reputation request to the web resource analyser engine.

15. The apparatus according to claim 10, the one or more processor devices being further configured to:
receive a list of cipher suites supported by the client computing device with the first message; and
select a cipher suite value that is not found on the list of cipher suites as the invalid cipher suite value.

16. The apparatus according to claim 10, the one or more processor devices being further configured to select a cipher suite value as the invalid cipher suite value based on the QUIC standard.

17. The apparatus according to claim 10, wherein the first message comprises at least a TLS version and cipher suites that the client computing device supports.

18. The apparatus according to claim 10, the one or more processor devices being further configured to one or more of:
report a security-related incident;
control or block further connections or usage of one or more applications of the client computing device;
prevent communication between the client computing device and the target computing device; and
apply other security measures to protect a local network and/or one or more computing devices.

19. A non-transitory computer-readable medium comprising stored program code, the program code comprised of computer-executable instructions that, when executed by a processor device, causes the processor device to:
receive a first message relating to a transport layer security (TLS) handshake process for an initialization phase of a Quic user datagram protocol (UDP) Internet Connection (QUIC) connection from a client computing device toward a target computing device, wherein the first message of the TLS handshake process comprises at least a connection identifier;
make a determination to block the QUIC connection;
in response to making the determination to block the QUIC connection, generate a second message relating to the TLS handshake process in response to the first message, wherein a cipher suite value of the second message is set to an invalid cipher suite value for the client computing device, wherein the invalid cipher suite value is unsupported by the client computing device; and
sending the second message to the client computing device to cause the client computing device to close the QUIC connection.

20. The non-transitory computer-readable medium according to claim 19, wherein the computer-executable instructions, when executed by the processor device, further cause the processor device to generate the second message in response to determining that denying the QUIC connection is required before start of a hypertext transfer protocol (HTTP) connection.

\* \* \* \* \*